(12) United States Patent
Huggins et al.

(10) Patent No.: US 11,386,774 B2
(45) Date of Patent: *Jul. 12, 2022

(54) SYSTEMS AND METHODS FOR REMOTE POWER TOOL DEVICE CONTROL

(71) Applicant: TECHTRONIC CORDLESS GP, Anderson, SC (US)

(72) Inventors: Mark Huggins, Anderson, SC (US); Tyler J. Rowe, Anderson, SC (US); Frederick W. Bryan, Greenville, SC (US); Mark K. Stokes, Clemson, SC (US)

(73) Assignee: TECHTRONIC CORDLESS GP, Anderson, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/236,442

(22) Filed: Apr. 21, 2021

(65) Prior Publication Data

US 2021/0241609 A1 Aug. 5, 2021

Related U.S. Application Data

(63) Continuation of application No. 16/524,970, filed on Jul. 29, 2019, now Pat. No. 11,011,053.
(Continued)

(51) Int. Cl.
*G08C 17/02* (2006.01)
*H02J 7/00* (2006.01)
*H01M 10/42* (2006.01)

(52) U.S. Cl.
CPC .......... *G08C 17/02* (2013.01); *H01M 10/425* (2013.01); *H02J 7/0063* (2013.01);
(Continued)

(58) Field of Classification Search
CPC ................ G08C 17/02; H01M 10/425; H01M 2010/4271; H01M 2010/4278;
(Continued)

(56) References Cited

U.S. PATENT DOCUMENTS 3,626,545 A 12/1971 Sparrow
4,306,329 A 12/1981 Yokoi
(Continued)

FOREIGN PATENT DOCUMENTS

CA 2786726 A1 11/2005
CN 201086970 Y 7/2008
(Continued)

OTHER PUBLICATIONS

Instagram, Toolpig—Tools Carpentry Construction on Instagram, <https://www.instagram.com/p/BUchhjBgtmP/> published May 23, 2017, 1 page.
(Continued)

*Primary Examiner* — Nam V Nguyen
(74) *Attorney, Agent, or Firm* — Michael Best & Friedrich LLP

(57) ABSTRACT

Systems and methods for remote power tool control are provided. In one example, a battery pack is coupled to a power tool device. The battery pack includes a pack transceiver and a pack electronic processor. The pack electronic processor is coupled to the pack transceiver and is configured to determine that the power tool device is remotely controllable. The pack electronic processor is further configured to receive, wirelessly via a pack transceiver of the battery pack, a remote control command from a mobile device, and to provide the remote control command to the power tool device. The system further includes a tool electronic processor of the power tool device in communication with the pack electronic processor. The tool electronic
(Continued)

processor is configured to control the power tool device to perform an action specified by the remote control command in response to receiving the remote control command.

16 Claims, 6 Drawing Sheets

Related U.S. Application Data

(60) Provisional application No. 62/712,473, filed on Jul. 31, 2018.

(52) U.S. Cl.
CPC .............. *H01M 2010/4271* (2013.01); *H01M 2010/4278* (2013.01); *H01M 2220/30* (2013.01)

(58) Field of Classification Search
CPC ... H01M 2220/30; H02J 7/0063; Y02E 60/10; B25F 5/00
USPC ................ 340/12.5, 7.38, 680; 700/160, 168
See application file for complete search history.

(56) References Cited

U.S. PATENT DOCUMENTS

| | | | |
|---|---|---|---|
| 5,120,983 A | 6/1992 | Sämann | |
| 5,256,906 A | 10/1993 | Tsuge et al. | |
| 5,274,878 A | 1/1994 | Radabaugh et al. | |
| 5,606,767 A | 3/1997 | Crlenjak et al. | |
| 5,709,007 A | 1/1998 | Chiang | |
| 5,839,156 A | 11/1998 | Park et al. | |
| 5,903,462 A | 5/1999 | Wagner et al. | |
| 6,044,519 A | 4/2000 | Hendrix | |
| 6,058,071 A * | 5/2000 | Woodall | H04B 11/00 367/134 |
| 6,222,285 B1 | 4/2001 | Haley et al. | |
| 6,424,799 B1 | 7/2002 | Gilmore | |
| 6,536,536 B1 | 3/2003 | Gass et al. | |
| 6,607,041 B2 | 8/2003 | Suzuki et al. | |
| 6,615,930 B2 | 9/2003 | Bongers-Ambrosius et al. | |
| 6,675,196 B1 | 1/2004 | Kronz | |
| 6,834,730 B2 | 12/2004 | Gass et al. | |
| 6,836,614 B2 | 12/2004 | Gilmore | |
| 6,845,279 B1 | 1/2005 | Gilmore et al. | |
| 6,851,900 B2 | 2/2005 | Tillemans et al. | |
| 6,913,087 B1 | 7/2005 | Brotto et al. | |
| 6,967,972 B1 | 11/2005 | Volftsun et al. | |
| 7,036,605 B2 | 5/2006 | Suzuki et al. | |
| 7,036,703 B2 | 5/2006 | Grazioli et al. | |
| 7,040,972 B2 | 5/2006 | Hoffmann et al. | |
| 7,054,696 B2 | 5/2006 | Crowell | |
| 7,093,668 B2 | 8/2006 | Gass et al. | |
| 7,102,303 B2 | 9/2006 | Brotto | |
| 7,112,934 B2 | 9/2006 | Gilmore | |
| 7,121,358 B2 | 10/2006 | Gass et al. | |
| 7,243,152 B2 | 7/2007 | Guggisberg | |
| 7,296,323 B2 | 11/2007 | Hayama et al. | |
| 7,298,240 B2 | 11/2007 | Lamar | |
| 7,328,752 B2 | 2/2008 | Gass et al. | |
| 7,330,129 B2 | 2/2008 | Crowell et al. | |
| 7,346,406 B2 | 3/2008 | Brotto et al. | |
| 7,346,422 B2 | 3/2008 | Tsuchiya et al. | |
| 7,391,326 B2 | 6/2008 | Puzio et al. | |
| 7,437,204 B2 | 10/2008 | Lev-Ami et al. | |
| 7,540,334 B2 | 6/2009 | Gass et al. | |
| 7,613,590 B2 | 11/2009 | Brown | |
| 7,646,155 B2 | 1/2010 | Woods et al. | |
| 7,688,028 B2 | 3/2010 | Phillips et al. | |
| 7,721,006 B2 | 5/2010 | Morrow | |
| 7,723,952 B2 | 5/2010 | Phillips et al. | |
| 7,750,811 B2 | 7/2010 | Puzio et al. | |
| 7,809,495 B2 | 10/2010 | Leufen | |
| 7,834,566 B2 | 11/2010 | Woods et al. | |
| 7,868,591 B2 | 1/2011 | Phillips et al. | |
| 7,896,098 B2 | 3/2011 | Suzuki et al. | |
| 7,928,673 B2 | 4/2011 | Woods et al. | |
| 7,953,965 B2 | 5/2011 | Qin et al. | |
| 8,004,664 B2 | 8/2011 | Etter et al. | |
| 8,005,647 B2 | 8/2011 | Armstrong et al. | |
| 8,169,298 B2 | 5/2012 | Wiesner et al. | |
| 8,210,275 B2 | 7/2012 | Suzuki et al. | |
| 8,294,424 B2 | 10/2012 | Bucur | |
| 8,310,206 B2 | 11/2012 | Bucur | |
| 8,443,485 B2 | 5/2013 | Kunz et al. | |
| 8,561,623 B2 | 10/2013 | Lowenstein | |
| 8,800,103 B2 | 8/2014 | Hong et al. | |
| 9,055,033 B2 | 6/2015 | Mergener | |
| 9,073,160 B2 | 7/2015 | Appel et al. | |
| 9,108,285 B2 | 8/2015 | Usselman | |
| 9,189,663 B2 | 11/2015 | Goren et al. | |
| 9,406,915 B2 | 8/2016 | White et al. | |
| 9,430,370 B2 | 8/2016 | Mergener | |
| 9,466,198 B2 | 10/2016 | Burch et al. | |
| 9,467,862 B2 * | 10/2016 | Zeiler | H04W 12/126 |
| 9,537,335 B2 | 1/2017 | Furui et al. | |
| 9,608,472 B2 | 3/2017 | Moshfeghi | |
| 9,652,217 B2 | 5/2017 | Winkler et al. | |
| 9,700,997 B2 | 7/2017 | Schlegel et al. | |
| 9,710,373 B2 | 7/2017 | Mergener | |
| 9,723,959 B2 | 8/2017 | Suzuki | |
| 9,756,402 B2 | 9/2017 | Stampfl et al. | |
| 9,900,967 B2 * | 2/2018 | Isaacs | H05B 47/115 |
| 9,906,045 B2 | 2/2018 | Kim et al. | |
| 9,916,739 B2 | 3/2018 | Suzuki | |
| 9,962,781 B2 | 5/2018 | Suzuki | |
| 10,039,137 B2 | 7/2018 | Nguyen | |
| 10,131,042 B2 * | 11/2018 | Mergener | B23B 47/00 |
| 10,349,498 B2 * | 7/2019 | Isaacs | H05B 47/115 |
| 10,380,883 B2 | 8/2019 | Matson et al. | |
| 10,510,199 B2 | 12/2019 | Hoossainy et al. | |
| 10,562,116 B2 * | 2/2020 | Dey, IV | B23D 51/16 |
| 10,646,982 B2 | 5/2020 | Dey, IV et al. | |
| 11,011,053 B2 * | 5/2021 | Huggins | G08C 17/02 |
| 2001/0052416 A1 | 12/2001 | Wissmach et al. | |
| 2002/0143411 A1 | 10/2002 | Varone et al. | |
| 2002/0153855 A1 | 10/2002 | Song et al. | |
| 2003/0033686 A1 | 2/2003 | Liu | |
| 2003/0172310 A1 | 9/2003 | Moyer | |
| 2004/0060145 A1 | 4/2004 | Hayama et al. | |
| 2004/0093682 A1 | 5/2004 | Litomisky et al. | |
| 2004/0199364 A1 | 10/2004 | Law | |
| 2004/0213868 A1 | 10/2004 | Hinzpeter et al. | |
| 2005/0114718 A1 | 5/2005 | Ito | |
| 2005/0195930 A1 | 9/2005 | Spital | |
| 2005/0221739 A1 | 10/2005 | Hoffmann et al. | |
| 2005/0237189 A1 | 10/2005 | Tani | |
| 2005/0279213 A1 | 12/2005 | Otto | |
| 2006/0095158 A1 | 5/2006 | Lee et al. | |
| 2006/0261749 A1 | 11/2006 | Campbell | |
| 2006/0293788 A1 | 12/2006 | Pogodin | |
| 2007/0283521 A1 | 12/2007 | Foster et al. | |
| 2008/0022479 A1 | 1/2008 | Zhao | |
| 2008/0287062 A1 | 11/2008 | Claus et al. | |
| 2009/0024757 A1 | 1/2009 | Proctor | |
| 2009/0058361 A1 | 3/2009 | John | |
| 2009/0076656 A1 | 3/2009 | Lutz et al. | |
| 2009/0217483 A1 | 9/2009 | Lee et al. | |
| 2009/0241283 A1 | 10/2009 | Loveless et al. | |
| 2009/0250364 A1 | 10/2009 | Gerold et al. | |
| 2009/0251330 A1 | 10/2009 | Gerold et al. | |
| 2009/0254203 A1 | 10/2009 | Gerold et al. | |
| 2009/0327543 A1 | 12/2009 | Teggatz et al. | |
| 2010/0096151 A1 | 4/2010 | Ostling | |
| 2010/0176766 A1 | 7/2010 | Brandner et al. | |
| 2010/0199453 A1 | 8/2010 | Brotto et al. | |
| 2011/0015764 A1 | 1/2011 | Chen et al. | |
| 2011/0056716 A1 | 3/2011 | Jonsson et al. | |
| 2011/0073343 A1 | 3/2011 | Sawano et al. | |
| 2011/0114345 A1 | 5/2011 | Schlesak et al. | |
| 2012/0073077 A1 | 3/2012 | Ishikawa et al. | |
| 2012/0083298 A1 | 4/2012 | Park et al. | |

(56) References Cited

U.S. PATENT DOCUMENTS

| | | |
|---|---|---|
| 2012/0100803 A1 | 4/2012 | Suumäki et al. |
| 2012/0104991 A1 | 5/2012 | Suzuki et al. |
| 2012/0187851 A1 | 7/2012 | Huggins et al. |
| 2012/0238119 A1 | 9/2012 | Rejman et al. |
| 2012/0302101 A1 | 11/2012 | Brotto et al. |
| 2012/0312570 A1 | 12/2012 | Wanek et al. |
| 2012/0325507 A1 | 12/2012 | Fluhrer et al. |
| 2013/0005246 A1 | 1/2013 | Waters et al. |
| 2013/0068255 A1 | 3/2013 | Heger |
| 2013/0241699 A1 | 9/2013 | Covaro |
| 2013/0257360 A1 | 10/2013 | Singh |
| 2013/0288599 A1 | 10/2013 | Bernard et al. |
| 2013/0331973 A1 | 12/2013 | Clark et al. |
| 2014/0008087 A1 | 1/2014 | Brown et al. |
| 2014/0025834 A1 | 1/2014 | Mergener |
| 2014/0151079 A1 | 6/2014 | Furui et al. |
| 2014/0158389 A1 | 6/2014 | Ito et al. |
| 2014/0191664 A1 | 7/2014 | Johnson et al. |
| 2014/0213179 A1 | 7/2014 | Rosenberg |
| 2014/0237753 A1 | 8/2014 | Conrad |
| 2014/0261551 A1 | 9/2014 | Usselman |
| 2014/0304939 A1 | 10/2014 | Suzuki |
| 2014/0315487 A1 | 10/2014 | Lu |
| 2014/0337952 A1 | 11/2014 | Bahr et al. |
| 2015/0070142 A1 | 3/2015 | Miki et al. |
| 2015/0162646 A1 | 6/2015 | Kawase et al. |
| 2016/0049697 A1 | 2/2016 | McGee |
| 2016/0085253 A1 | 3/2016 | Knight et al. |
| 2016/0100724 A1 | 4/2016 | Valentini |
| 2016/0151846 A1 | 6/2016 | Suzuki |
| 2016/0175895 A1 | 6/2016 | Suzuki |
| 2016/0311094 A1 | 10/2016 | Mergener et al. |
| 2016/0317131 A1* | 11/2016 | Schwartz Klessel ........................ A61B 8/4472 |
| 2016/0342142 A1 | 11/2016 | Boeck et al. |
| 2016/0367266 A1 | 12/2016 | Palmerton et al. |
| 2016/0373457 A1* | 12/2016 | Matson ................ H04L 67/306 |
| 2017/0057040 A1 | 3/2017 | Rzasa et al. |
| 2017/0153631 A1 | 6/2017 | Jonsson |
| 2017/0193761 A1 | 7/2017 | Suzuki |
| 2017/0201853 A1 | 7/2017 | Chen et al. |
| 2017/0201886 A1 | 7/2017 | Yang et al. |
| 2017/0257472 A1 | 9/2017 | Gehring et al. |
| 2017/0300406 A1 | 10/2017 | Mergener |
| 2017/0326696 A1 | 11/2017 | Halverson |
| 2018/0126537 A1 | 5/2018 | Tanaka et al. |
| 2018/0229317 A1 | 8/2018 | Suzuki |
| 2019/0011892 A1 | 1/2019 | Post et al. |
| 2019/0022775 A1 | 1/2019 | Suzuki |
| 2019/0067756 A1 | 2/2019 | Lee et al. |
| 2019/0077003 A1* | 3/2019 | Lennings ............... G05B 19/05 |
| 2019/0097469 A1 | 3/2019 | Watanabe |
| 2019/0271973 A1* | 9/2019 | Conrad ............... B25B 23/1475 |
| 2020/0119408 A1* | 4/2020 | Kim .................... H01M 10/425 |

FOREIGN PATENT DOCUMENTS

| | | |
|---|---|---|
| CN | 101234012 A | 8/2008 |
| CN | 102490172 A | 6/2012 |
| CN | 203042139 U | 7/2013 |
| CN | 106385661 A | 2/2017 |
| CN | 106909156 A | 6/2017 |
| DE | 8808570 U1 | 10/1988 |
| DE | 102012003073 A1 | 8/2013 |
| DE | 102012003077 A1 | 8/2013 |
| DE | 102013222313 A1 | 5/2015 |
| DE | 202017104107 A1 | 7/2017 |
| EP | 0371236 A2 | 6/1990 |
| EP | 1016946 B1 | 5/2006 |
| EP | 2229857 A2 | 9/2010 |
| EP | 2233993 A1 | 9/2010 |
| EP | 2628427 A2 | 8/2013 |
| EP | 2628428 A2 | 8/2013 |
| EP | 2687331 A1 | 1/2014 |
| EP | 2878249 A1 | 6/2015 |
| EP | 2946710 A2 | 11/2015 |
| EP | 3028810 A1 | 6/2016 |
| EP | 3159114 A1 | 4/2017 |
| EP | 3272261 A2 | 1/2018 |
| EP | 3272467 A2 | 1/2018 |
| EP | 2628431 B1 | 10/2018 |
| EP | 3415066 A1 | 12/2018 |
| EP | 3528213 A1 | 8/2019 |
| JP | H07222756 A | 8/1995 |
| JP | 2001137158 A | 5/2001 |
| JP | 2001161607 A | 6/2001 |
| JP | 2002209818 A | 7/2002 |
| JP | 2002224631 A | 8/2002 |
| JP | 2005102791 A | 4/2005 |
| JP | 2007063846 A | 3/2007 |
| JP | 2007301344 A | 11/2007 |
| JP | 2008000739 A | 1/2008 |
| JP | 2008220567 A | 9/2008 |
| JP | 2009083043 A | 4/2009 |
| JP | 4550357 B2 | 9/2010 |
| JP | 2011079082 A | 4/2011 |
| JP | 4955332 B2 | 6/2012 |
| JP | 2014057635 A | 4/2014 |
| JP | 2014525840 A | 10/2014 |
| JP | 5828110 B2 | 12/2015 |
| JP | 2016209997 A | 12/2016 |
| JP | 2018069445 A | 5/2018 |
| KR | 0175512 B1 | 2/1999 |
| KR | 200321249 Y1 | 7/2003 |
| KR | 100725516 B1 | 6/2007 |
| KR | 100833125 B1 | 5/2008 |
| WO | WO2004010253 A2 | 1/2004 |
| WO | WO2007090258 A1 | 8/2007 |
| WO | WO2008064952 A1 | 6/2008 |
| WO | WO2010085637 A1 | 7/2010 |
| WO | WO2011115121 A1 | 9/2011 |
| WO | WO2012027739 A2 | 3/2012 |
| WO | WO2012031925 A1 | 3/2012 |
| WO | WO2012061673 A2 | 5/2012 |
| WO | WO2015162193 A1 | 10/2015 |
| WO | WO2017075547 A1 | 5/2017 |
| WO | WO2017171609 A1 | 10/2017 |
| WO | WO2018162233 A1 | 9/2018 |
| WO | WO2018177623 A1 | 10/2018 |
| WO | WO2018180896 A1 | 10/2018 |

OTHER PUBLICATIONS

Instagram, Toolpig—Tools Carpentry Construction on Instagram, <https://www.instagram.com/p/BUR9YHFgr3N/?hl=en> published May 19, 2017, 1 page.

Makita, Auto-Start Wireless System, <https://www.makitatools.com/aws>, 2018 [website accessed Jan. 25, 2018] 6 pages.

Makita, Makita Tools 2017 New Product Launch Event, <http://www.coptool.com/makita-2017-new-products-event/> published May 22, 2017, 14 pages.

Toolguyd, New Makita 18V X2 Brushlees Miter Saw with Remote Dust Vac Trigger, <https://toolguyd.com/makita-18v-x2-brushless-miter-saw-xsl06-with-bluetooth-dust-collection-activation/> published May 24, 2017, 15 pages.

Youtube, Coptool—Makita 18v LXT X2 Brushless 10" Miter Saw XSL06 & Corded LS1019L, <https://www.youtube.com/watch?v=-lqr26tB6Fg> published May 22, 2017, 9 pages.

International Search Report and Written Opinion for Application No. PCT/US2013/050946 dated Jan. 22, 2014 (9 pages).

German Patent Office Action for Application No. 112013003581.2 with English Translation dated Apr. 10, 2017 (15 pages).

International Search Report and Written Opinion for Application No. PCT/US2018/028072 dated Aug. 6, 2018, 12 pages.

United States Patent Office Final Rejection for U.S. Appl. No. 15/955,915 dated Dec. 21, 2018, 44 pages.

Taiwan Patent Office Action for Application No. 10820388720 dated Apr. 29, 2019, 14 pages.

Chiueh et al., "A Networked Robot System for Wireless Network Emulation." In Proceedings of the 1st international conference on Robot communication and coordination, IEEE Press, 2007, 8 pages.

(56) References Cited

OTHER PUBLICATIONS

Domnitcheva, "Smart Vacuum Cleaner—An Autonomous Location-Aware Cleaning Device." In Proceedings of the 6th International Conference on Ubiquitous Computing, Tokyo, Japan, 2004, 2 pages.
Infinity Cutting Tools, "iVac Automated Dust Collection—Carbide Router Bits." <https://www.infinitytools.com/iVac-Automated-Dust-Collection/departments/1789/> webpage available as early as Mar. 8, 2013, 2 pages.
Mbright Tools, "iVAC Pro User Guide." <https://web.archive.org/web/20110415084930/http://www.ivacswitch.com/default.action?itemid=25> webpage available as early as Apr. 15, 2011, 66 pages.
Mbright Tools, "Overview of the iVAC Pro System." <https://web.archive.org/web/20110415084949/http://www.ivacswitch.com/default.action?itemid=35> webpage available as early as Apr. 15, 2011, 1 page.
Bluetooth, "Specification of the Bluetooth System." Version 4.0 vol. 0., published Jun. 30, 2010, 2302 pages.
European Patent Office Extended Search Report for Application No. 18190808.8 dated Jan. 18, 2019 (7 pages).
European Patent Office Extended Search Report for Application No. 19189302.2 dated Jan. 3, 2020 (8 pages).
United Kingdom Intellectual Property Office Examination Report for Application No. 1501111.7 dated Jan. 20, 2020 (3 pages).

\* cited by examiner

SYSTEMS AND METHODS FOR REMOTE POWER TOOL DEVICE CONTROL

CROSS-REFERENCE TO RELATED APPLICATION

This application is a continuation of U.S. patent application Ser. No. 16/524,970, filed Jul. 29, 2019, now U.S. Pat. No. 11,011,053, which claims the benefit of U.S. Provisional Patent Application No. 62/712,473, filed on Jul. 31, 2018, the entire contents of each of which is hereby incorporated by reference.

FIELD OF THE INVENTION

This application relates to controlling power tools with a mobile device through a battery pack of the power tool.

DETAILED DESCRIPTION OF THE INVENTION

Figure 1:
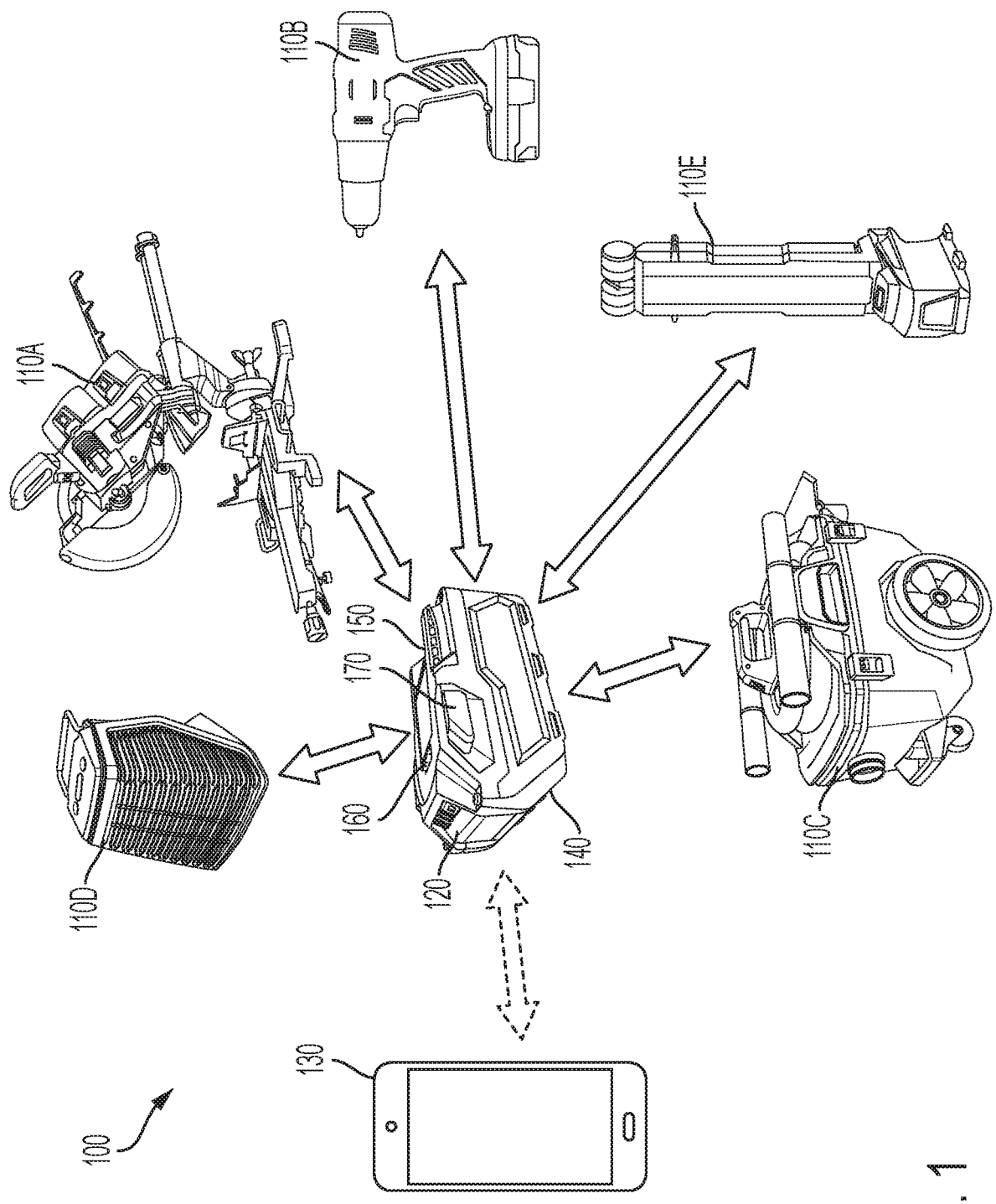
FIG. 1 is a communication system including a mobile device, a battery pack, and power tools.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

One embodiment discloses a system for remote controlling a power tool device. The system includes a battery pack coupled to a power tool device. The battery pack includes a pack memory, a pack transceiver, and a pack electronic processor. The pack electronic processor is coupled to the pack memory and the pack transceiver and is configured to determine that the power tool device is remotely controllable. The pack electronic processor is further configured to receive, wirelessly via a pack transceiver of the battery pack, a remote control command from a mobile device, and to provide the remote control command to the power tool device. The system further includes a tool electronic processor of the power tool device in communication with the pack electronic processor. The tool electronic processor is configured to control the power tool device to perform an action specified by the remote control command in response to receiving the remote control command. In some examples, the tool electronic processor is further configured to place the power tool device in a remote control mode in response to user input.

Another embodiment provides a method for remote controlling a power tool device. The power tool device is powered by a battery pack. The method includes determining, by a pack electronic processor of the battery pack, that the power tool device is remotely controllable and receiving, wirelessly via a pack transceiver of the battery pack, a remote control command from a mobile device. The method also includes providing the remote control command, by the pack electronic processor to the tool electronic processor of the power tool device, and controlling, using the tool electronic processor, the power tool device to perform an action specified by the remote control command in response to the tool electronic processor receiving the remote control command. In some examples, the method further includes placing the power tool device in a remote control mode in response to user input.

Another embodiment provides a battery pack connectable to a power tool device and configured to facilitate remote control of the power tool device by a mobile device. The battery pack includes a plurality of cells providing operating power to the power tool device, wherein the power tool device is coupled to the battery pack and a pack transceiver. The battery pack also includes a pack electronic processor electrically coupled to the transceiver. The pack electronic processor is further configured to determine that the connected power tool device is remotely controllable and receive, wirelessly via the pack transceiver, a remote control command from the mobile device. The pack electronic processor is also configured to provide, via a communication link between the pack electronic processor and a tool electronic processor of the power tool device, the remote control command. The remote control command specifies an action to be performed by the power tool device. In some examples, the power tool device performs the function specified by the remote control command in response to receiving the remote control command.

FIG. 1 illustrates a communication system 100 including various power tool devices 110 powered by a battery pack 120. The system 100 also includes a mobile device 130 that can control the power tool devices 110 through the battery pack 120. The power tool devices 110 may include motorized power tool devices (for example, a miter saw 110A, a drill-driver 110B, a shop vacuum 110C, and the like) or non-motorized electrical devices (for example, a work radio 110D, a work light 110E, and the like). Each of the power tool devices 110A-E may be individually referred to as the power tool device 110, or collectively as the power tool devices 110. At least in some embodiments, the power tool devices 110 may be described as electrically powered devices that are configured to be coupled to and powered by a power tool battery pack (e.g., the battery pack 120) that is configured to be coupled to and power a motorized power tool (e.g., a drill, a saw, and the like).

The battery pack 120 is a power tool battery pack having a nominal voltage of, for example, 12 Volts, 18 Volts, and the like. The battery pack 120 includes a housing 140, a tool interface 150, and a latch 160 controlled by actuator 170 to selectively latch the tool interface 150 to a battery interface of the power tool 110. The mobile device 130 is a mobile communication device, for example, a smart telephone, a tablet computer, a laptop computer, a personal digital assistant, a smart wearable device (e.g., smart watch), and the like.

Figure 2:
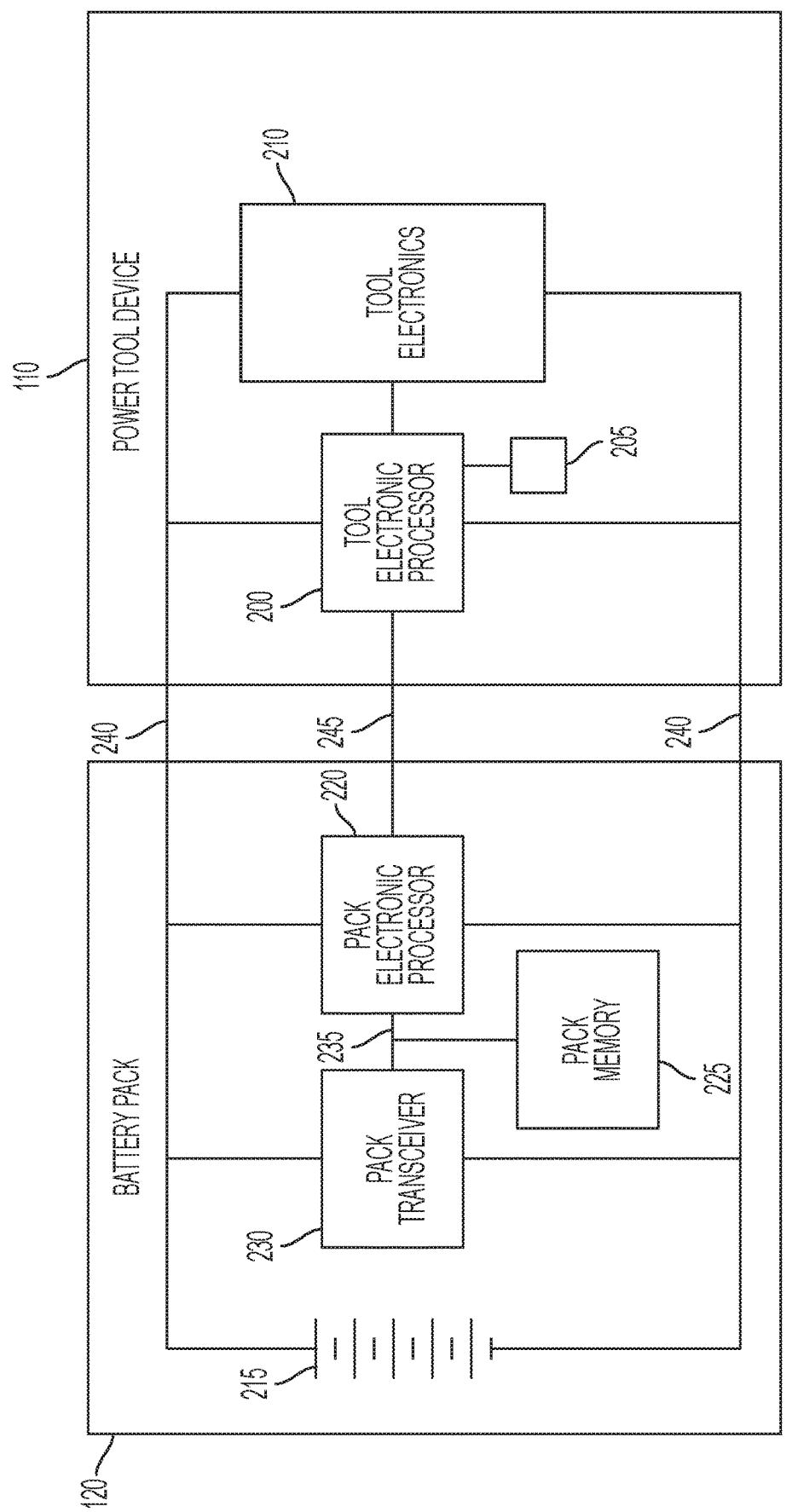
FIG. 2 is a block diagram of the battery pack and the power tool of FIG. 1 in accordance with some embodiments.

With reference to FIG. 2, the power tool device 110 includes a tool electronic processor 200, a tool memory 205, and tool electronics 210. The tool electronic processor 200 may be implemented as, for example, a microprocessor, a microcontroller, a field programmable gate array, an application specific integrated circuit, or the like. The tool memory 205 may be a part of the tool electronic processor 200 or may be a separate component. The tool memory 205 may include, for example, a program storage area and a data storage area. The tool memory 205 stores executable instructions that when executed by the tool electronic processor 200, cause the power tool device 110 to perform the functions described herein. For example, the tool electronic processor 200 controls the functions of the power tool device 110 and enables communication between the power tool device 110 and the battery pack 120. The tool electronics 210 may include a switch bridge and a motor (not shown) when the power tool device 110 is a motorized power tool and may include other electronics (e.g., LEDs, radio transceiver, speaker, and the like) when the power tool device 110 is a non-motorized electronic device. The tool electronics 210 are controlled by the tool electronic processor 200. For example, the tool electronic processor 200 is configured to one or more of enable the tool electronics 210, disable the tool electronics 210, and modify operating characteristics (e.g., motor power, LED brightness, radio tuning, speaker volume, and the like).

The battery pack 120 includes battery cells 215, a pack electronic processor 220, a pack memory 225, and a pack transceiver 230 within the housing 140. The pack electronic processor 220, the pack memory 225, and the pack transceiver 230 communicate over one or more control and or data buses (for example, a communication bus 235). The battery cells 215 may be arranged in a series, parallel, or series-parallel combination. For example, the battery cells 215 include one or more series strings of five cells connected in parallel. In some embodiments, the battery cells 215 have a lithium-ion based chemistry and each provide approximately 3.6 nominal voltage. In other embodiments, the battery cells 215 have different chemistry, voltage output, or both. The battery cells 215 provide operating power to the other components of the battery pack 120. Additionally, operating power from the battery cells 215 is provided to the power tool device 110 over power terminals 240.

The pack electronic processor 220 may be implemented as, for example, a microprocessor, a microcontroller, a field programmable gate array, an application specific integrated circuit, or the like. The pack memory 225 may be a part of the pack electronic processor 220 or may be a separate component. The pack memory 225 may include, for example, a program storage area and a data storage area. The pack memory 225 stores executable instructions that when executed by the pack electronic processor 220, cause the battery pack 120 to perform the functions described herein. The pack electronic processor 220 communicates with the tool electronic processor 200 over a communication terminal 245 to exchange data and control signals. The communication terminals 245 may implement a serial communication system for example, an RS-485 link or the like to facilitate communications between the pack electronic processor 220 and the tool electronic processor 200. In some embodiments, rather than over the communication terminal 245, the pack electronic processor 220 and the tool electronic processor 200 may communicate over near-field wireless communication link, for example, a Bluetooth® connection or the like. In such embodiments, the power tool device 110 and battery pack 120 include respective wireless transceivers to facilitate the wireless communications.

The pack transceiver 230 facilitates communication between the battery pack 120 and an external device, for example, the mobile device 130 over a wireless communication network. In some embodiments, the pack transceiver 230 includes a combined transmitter-receiver component. In other embodiments, the pack transceiver 230 includes separate transmitter and receiver components.

The power tool device 110 and the battery pack 120 may include more or fewer components and may perform functions other than those described herein.

Figure 3:
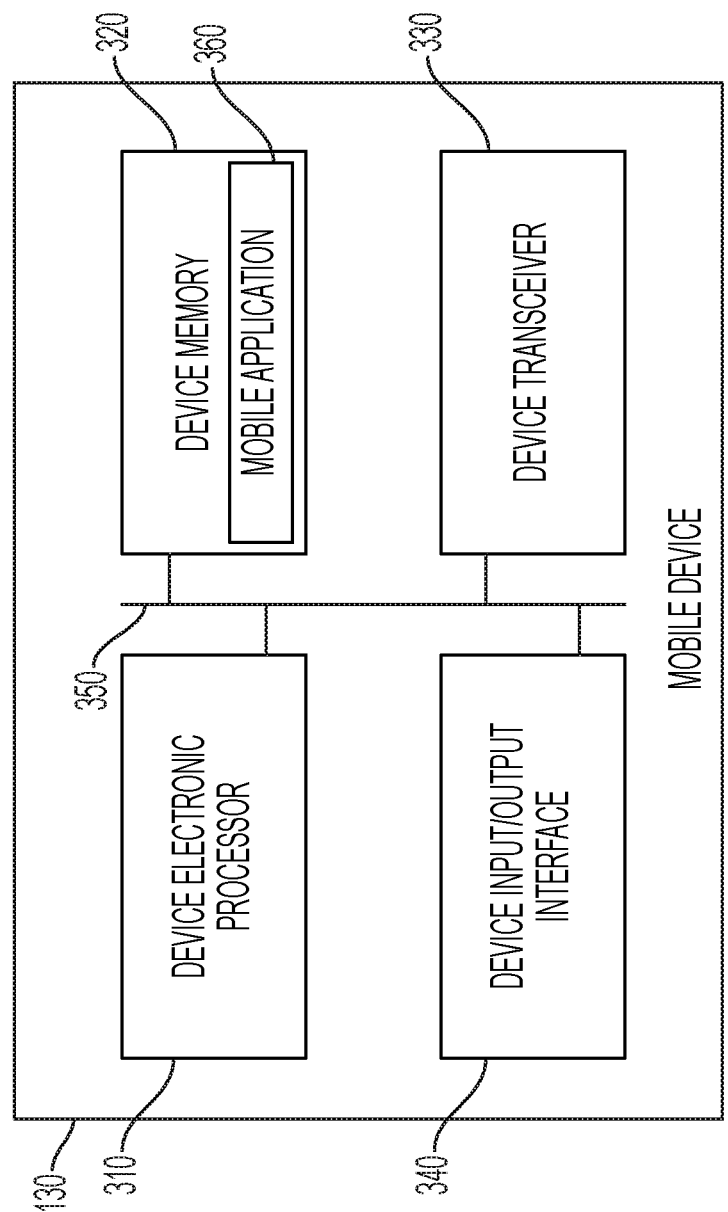
FIG. 3 is a block diagram of the mobile device of FIG. 1 in accordance with some embodiments.

With reference to FIG. 3, the mobile device 130 includes a device electronic processor 310, a device memory 320, a device transceiver 330, and device input/output interface 340. The device electronic processor 310, the device memory 320, the device transceiver 330, and the device input/output interface 340 communicate over one or more control and/or data buses (for example, a communication bus 350). The mobile device 130 may include more or fewer components and may perform functions other than those described herein.

The device electronic processor 310 may be implemented as, for example, a microprocessor, a microcontroller, a field programmable gate array, an application specific integrated circuit, or the like. The device memory 320 may store executable instructions that are executed by the device electronic processor 310 to carry out the functionality of the mobile device 130 described herein.

The device transceiver 330 facilitates communication between the mobile device 130 and an external device, for example, the battery pack 120 over a wireless communication network. In some embodiments, the device transceiver 330 includes a combined transmitter-receiver component. In other embodiments, the device transceiver 330 includes separate transmitter and receiver components. The device transceiver 330 is controlled by the device electronic processor 310, for example, to transmit and receive data between the mobile device 130 and the battery pack 120.

The device input/output interface 340 may include one or more input mechanisms (e.g., a keypad, a mouse, and the like), one or more output mechanisms (e.g., a display, a speaker, and the like), or a combination of the two (e.g., a touch screen, or the like).

The mobile device 130 also includes a mobile application 360, which is an application designed for a mobile operating system for use on the mobile device 130. The device memory 320 may store the mobile application 360 and the device electronic processor 310 executes the mobile application 360 to enable the mobile device 130 to carry out the functionality of the mobile application 360 described herein. The mobile application 360 may communicate with the battery pack 120 over a connection between the mobile device 130 and the battery pack 120. The mobile application 360 may include a graphical user interface in that, execution of the mobile application 360 by the device electronic processor 310 may generate a graphical user interface on a display (e.g., input/output interface 340) of the mobile device 130. The mobile device 130 may convey information to a user through display of the graphical user interface and may receive user input via the graphical user interface (i.e., the input/output interface 340).

In some embodiments, the mobile device 130 (via the device transceiver 330) and the battery pack 120 (via the pack transceiver 230) communicate over a direct wireless connection, for example, a Bluetooth® connection, a ZigBee® connection, or the like. In other embodiments, the mobile device 130 (via the device transceiver 330) and the battery pack 120 (via the pack transceiver 230) communicate over an indirect wireless connection, for example, over a cellular network, over the Internet, or the like.

Figure 4:
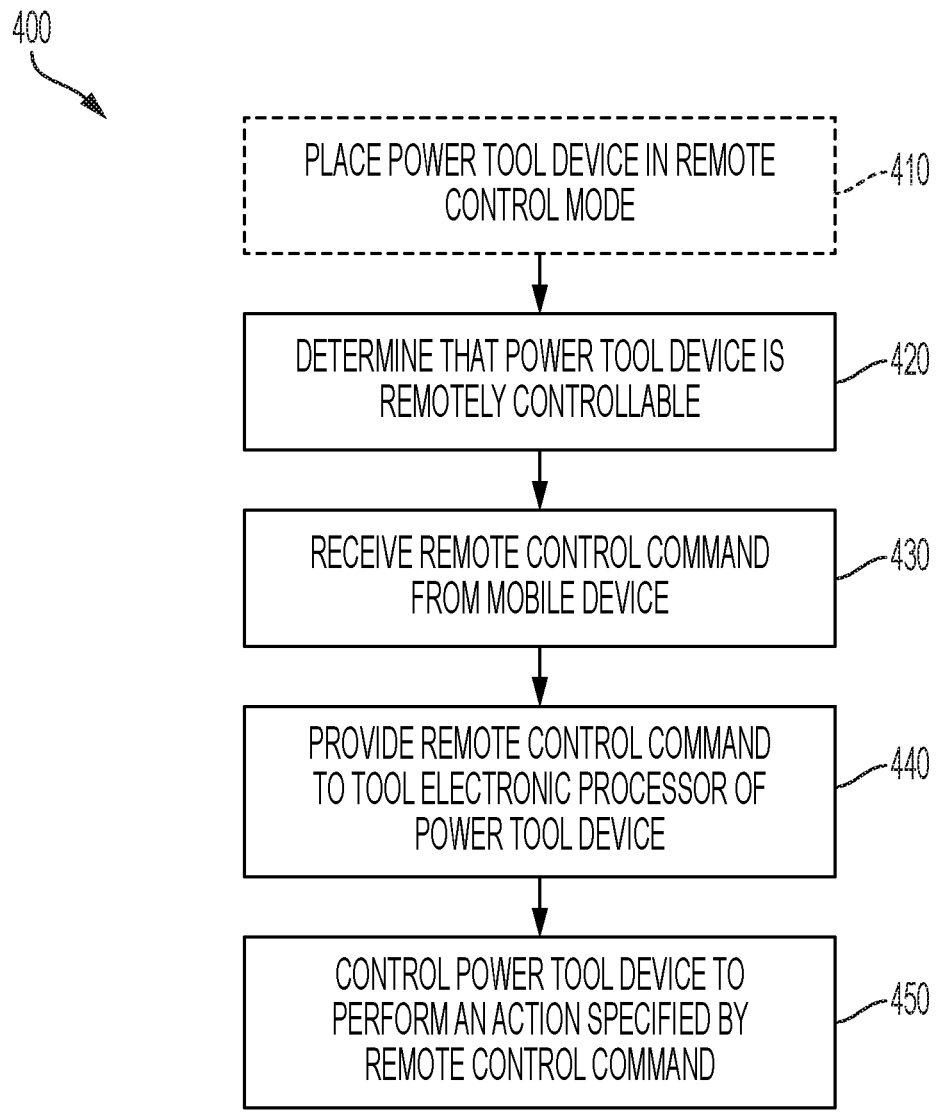
FIG. 4 is a flowchart of a method for remotely controlling the power tool device of FIG. 1 in accordance with some embodiments.

FIG. 4 is a flowchart illustrating an exemplary method 400 for remotely controlling the power tool device 110. As illustrated in FIG. 4, the method 400 includes placing the power tool device 110 in a remote control mode (at step 410). The power tool device 110 may include a mode switch (not shown) that can be actuated by a user to select a mode of the power tool device 110. For example, the mode switch may be between a first position for selecting the remote control mode and a second position for selecting a normal mode (i.e., deselecting the remote control mode) by the user. The tool electronic processor 200 receives position information of the mode switch and places the power tool device 110 in the selected mode. Particularly, the tool electronic processor 200 determines that the mode switch is in the first position and places the power tool device 110 in the remote control mode. When the power tool device 110 is in the remote control mode, the power tool device 110 can be remotely controlled by the mobile device 130 as described below. When the power tool device 110 is in the normal mode, the power tool device 110 ignores (e.g., discards) commands received from the mobile device 130 without executing the received commands. However, the step 410 of placing the power tool device 110 in a remote control mode is optional. For example, in some embodiments, the power tool device 110 may always be in a remote control mode such that the power tool device 110 can be remotely controlled by the mobile device 130.

The method 400 also includes determining, by the pack electronic processor 220, that the power tool device 110 is remotely controllable (at step 420). The remote control feature may not be provided on every power tool device 110 configured to be coupled to and powered by the battery pack 120. For example, the remote control feature may be provided on the work radio 110D, the work light 110E, and the shop vacuum 110C, but may not be provided on the miter saw 110A or the drill-driver 110B. In some embodiments, the pack electronic processor 220 determines whether the power tool device 110 is remotely controllable using identification signals received from the power tool device 110. For example, the tool electronic processor 200 communicates identification signals over the communication terminal 245 to the pack electronic processor 220.

The identification signals may include for example, a type of the power tool (e.g., by model number), which is then used by the pack electronic processor 220 to access and retrieve from a lookup table an indication of whether the power tool device 110 is remotely controllable. The lookup table may be on the stored on the pack memory 225, the device memory 320, or a combination thereof. In some embodiments, the identification signals include an explicit indication of whether the power tool device 110 is remotely controllable or not remotely controllable.

In some embodiments, the battery pack 120 includes a sensor in communication with the pack electronic processor 220 that is configured to detect whether the power tool device 110 is remotely controllable. For example, the sensor of the battery pack 120 may be a Hall effect sensor configured to detect a magnetic field, and the power tool device 110 that is remotely controllable may include a magnet near its battery pack interface. Upon coupling the power tool device 110 and the battery pack 120, the sensor provides an output to the pack electronic processor 220 indicative of the presence (or absence) of the magnet or indicative of the pole orientation of the magnet, and the output is indicative of whether the power tool device 110 is remotely controllable. Accordingly, power tool devices 110 having no such magnet, or having a magnet with a pole orientation representing that the device is not remotely controllable, are determined by the pack electronic processor 220 to be not remotely controllable. Power tool devices 110 having a magnet, or having a magnet with a pole orientation representing that the device is remotely controllable, are determined by the pack electronic processor 220 to be remotely controllable.

The method 400 further includes receiving, by the pack electronic processor 220, a remote control command from the mobile device 130 (at step 430). The remote control command can be a command to, for example, turn the power tool device ON/OFF, activate a motor of the power tool device, switch an LED ON/OFF, adjust a radio station tuning, adjust an LED brightness, adjust a speaker volume, adjust a motor speed, and the like. The command can be selected on a graphical user interface of the mobile application 360. The battery pack 120 may communicate the type or identification information of the power tool device 110 connected to the battery pack 120 to the mobile device 130. The mobile device 130 may display a list of commands a user can select on the graphical user interface of the mobile application 360. When the mobile device 130 receives a selection of the remote control command from the list of commands (e.g., based on user input received by the device input/output interface 340), the mobile device 130 transmits the remote control command to the battery pack 120 via the device transceiver 330. Particularly, the pack electronic processor 220 receives the remote control command wirelessly via the pack transceiver 230.

The method also includes providing, by the pack electronic processor 220, the remote control command to the tool electronic processor 200 of the power tool device 110 (at step 440). The pack electronic processor 220 relays the command received from the mobile device 130 to the tool electronic processor 200. As described above, the pack electronic processor 220 and the tool electronic processor 200 communicate over the communication terminal 245 or over a near-field communication link. The pack electronic processor 220 provides the remote control command to the tool electronic processor 200 via the communication terminal 245 or the near-field communication link. In some embodiments, the pack electronic processor 220 may provide remote control command in response to determining that the power tool device 110 is remotely controllable, that the power tool device 110 is in a remote control mode, or both.

The method 400 further includes controlling, by the tool electronic processor 200, the power tool device 110 to perform an action specified by the remote control command (at step 450). The tool electronic processor 200, in response to receiving the remote control command, controls the tool electronics 210 to perform the action specified by the remote control command. For example, the tool electronic processor 200 turns the power tool device ON/OFF, activates a motor of the power tool device, switches an LED ON/OFF, adjusts a radio station tuning, adjusts an LED brightness, adjusts a speaker volume, adjusts a motor speed, and the like. In some embodiments, the power tool device 110 operates in a lower power draw mode until a remote control command is received from the battery pack 120. In the low power draw mode, the power draw is sufficient to maintain communication with the battery pack 120 and monitor for remote control commands, but not sufficient to perform the actions specified by the remote control command. Upon receiving the remote control command, the tool electronic processor 200 switches the power tool device 110 to the high power draw mode to perform the action specified by the remote control command.

While the steps of the method 400 are illustrated in a particular serial order, in some embodiments, one or more of the steps are executed in parallel or in a different order than illustrated. For example, one or both of steps 410 and 420 may occur in parallel with or after step 430.

Figure 5:
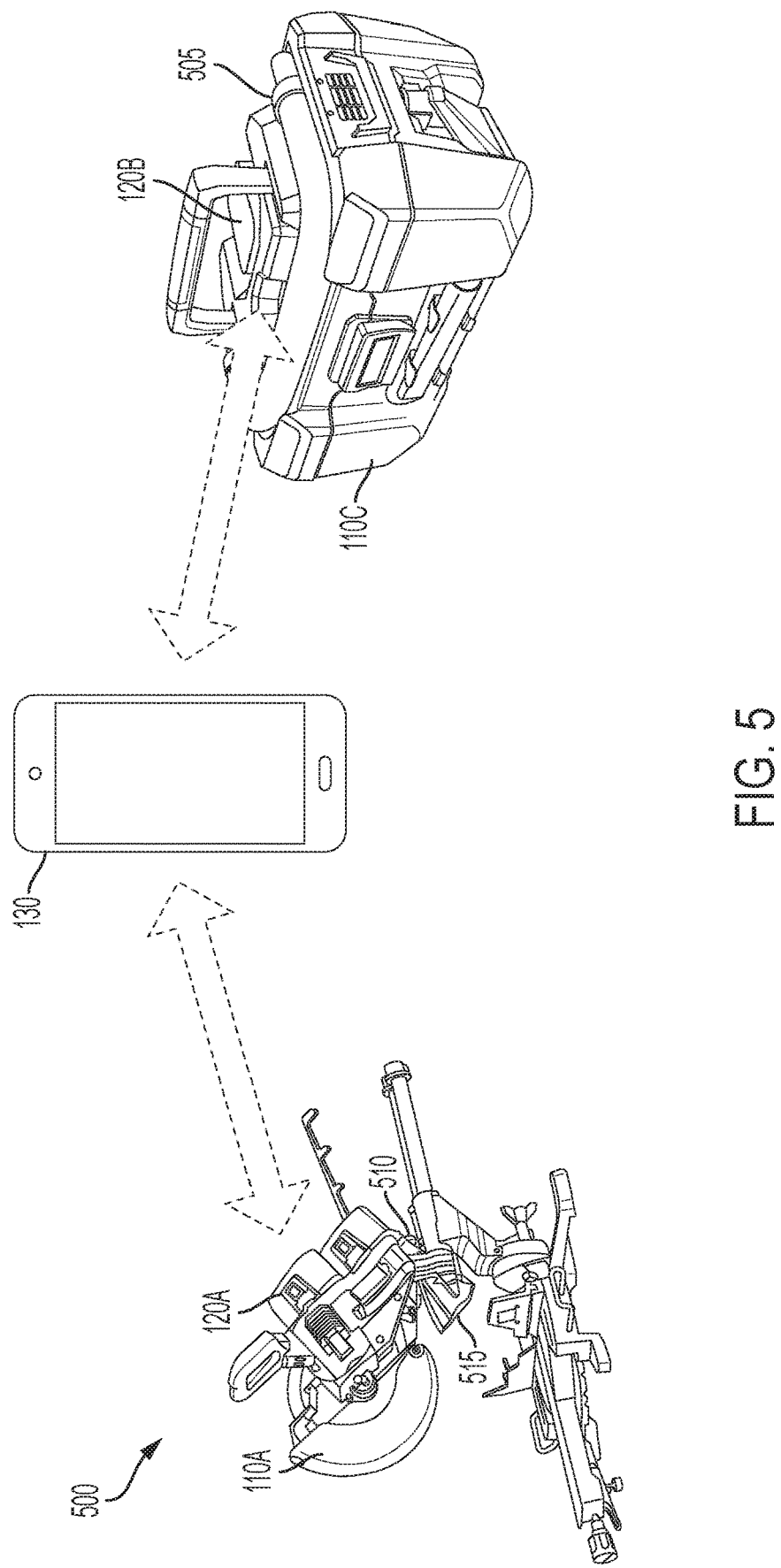
FIG. 5 is a system for communication between a miter saw and a shop vacuum through battery packs and the mobile device in accordance with some embodiments.

FIG. 5 illustrates one example system 500 for implementing a remote controlling of power tool devices 110. The system 500 includes the miter saw 110A (for example, a first power tool device) connected to a first battery pack 120A, the shop vacuum 110C (for example, a second power tool device) connected to a second battery pack 120B, and the mobile device 130. The first battery pack 120A and the second battery pack 120B are examples of the battery pack 120 described above. Accordingly, the description provided above with respect to the battery pack 120 similarly applies to the first battery pack 120A and the second battery pack 120B. The mobile device 130 wirelessly communicates with the first battery pack 120A and the second battery pack 120B as described above.

When the miter saw 110A is operated on a workpiece, the resulting cut may create dust that is deposited on the work bench. Users may use the shop vacuum 110C to clear the dust deposited by the miter saw 110A. However, the user may have to pause the current cut to vacuum excess dust, or operate the vacuum between successive cuts to clear dust. This dust removal may result in a user taking additional time to complete a project. In some embodiments, a hose 505 of the shop vacuum 110C is directly coupled to a dust port 510 of the miter saw 110A. The dust port 510 includes a dust intake end 515 near the saw blade to extract dust during a cut and a dust exhaust end, opposite the dust intake end 515, to expel extracted dust into the hose 505 coupled to the dust port. Still, users may need to manually turn on and off the shop vacuum 110 with each cut, or leave the shop vacuum 110 enabled between cuts despite a lack of dust needing extraction between cuts.

Figure 6:
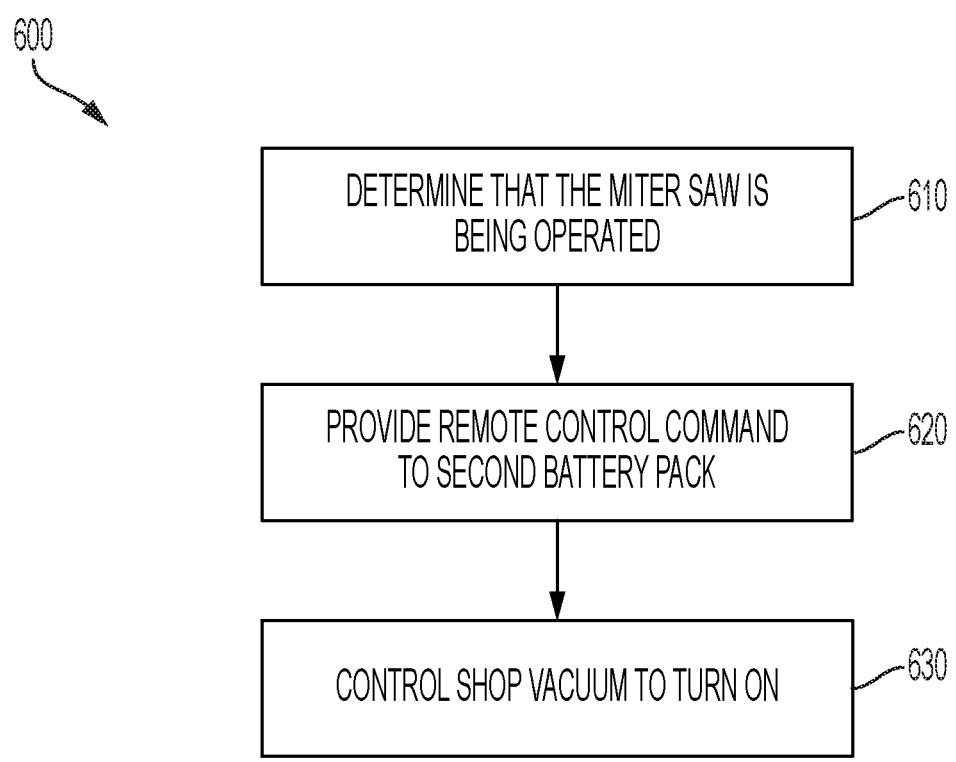
FIG. 6 is a flowchart of a method for automating dust collection during operation of the miter saw of FIG. 5 in accordance with some embodiments.

The dust collection process can be automated to be more efficient and to speed up the project by remotely controlling the shop vacuum 110C while the miter saw 110A is being operated. FIG. 6 is a flowchart illustrating an exemplary method 600 for automating dust collection during operation of a miter saw 110A. As illustrated in FIG. 6, the method 600 includes determining, by the device electronic processor 310, that the miter saw 110A (i.e., the first power tool device 110) is being operated (at step 610). For example, a pack electronic processor of the first battery pack 120A detects a power draw when the user operates the miter saw 110A, for example, using a current sensor electrically connected to the power terminals of the first battery pack 120A. The pack electronic processor of the first battery pack 120A sends a signal, via the pack transceiver, indicating that the miter saw 110A is being operated to the mobile device 130 in response to detecting the power draw. The device electronic processor 310 of the mobile device 130 determines that the miter saw 110A is being operated upon receiving this signal from the first battery pack 120A.

The method 600 also includes providing, by the device electronic processor 310, a remote control command to the second battery pack 120B in response to the determination that the miter saw 110A is being operated (at step 620). For example, in response to determining that the miter saw 110A is being operated, the device electronic processor 310 transmits the remote control command via the device transceiver 330, and the remote command is received by the second battery pack 120B. The remote control command is a request to turn the shop vacuum 110C (i.e., the second power tool 110) ON (i.e., to activate a motor of the shop vacuum 110C).

The method further includes controlling the shop vacuum to turn ON in response to the remote control command received by the second battery pack 120B (at step 630). For example, the pack electronic processor 220 of the second battery pack 120B relays the remote control command to the tool electronic processor 200 of the shop vacuum 110C. In response to the remote control command, the tool electronic processor 200 of the shop vacuum 110C switches the shop vacuum 110 from the low power draw mode to the high power draw mode and activates the motor of the shop vacuum 110C. Accordingly, the shop vacuum 110C may be operated essentially simultaneously with the miter saw 110A without any user intervention. In other words, when the miter saw 110A is activated by the user, the shop vacuum 110C is activated. This allows the dust collection process to be automated, which saves time for the user and provided a more efficient dust extraction.

In some embodiments, a similar technique is used to deactivate the shop vacuum 110C in response to deactivation of the miter saw 110 by the user. For example, after step 630, the device electronic processor 310 determines that the miter saw 110A (i.e., the first power tool device 110) has ceased being operated. For example, the pack electronic processor 220 of the first battery pack 120A detects a lack of power draw by the miter saw 110A in response to the user releasing a trigger of the saw. In turn, the pack electronic processor 220 of the first battery pack 120A sends a signal, via the pack transceiver, indicating that the miter saw 110A has ceased being operated to the mobile device. In response to receiving the signal, the device electronic processor 310 of the mobile device 130 determines that the miter saw 110A has ceased being operated.

Further, the device electronic processor 310 provides a second remote control command to the second battery pack 120B in response to the determination that the miter saw 110A has ceased being operated. For example, in response to determining that the miter saw 110A has ceased being operated, the device electronic processor 310 transmits the second remote control command via the device transceiver 330, and the second remote command is received by the second battery pack 120B. The second remote control command is a request to turn the shop vacuum 110C (i.e., the second power tool 110) OFF (i.e., to deactivate a motor of the shop vacuum 110C).

Further, the shop vacuum is controlled to turn OFF in response to the second remote control command received by the second battery pack 120B. For example, the pack electronic processor 220 of the second battery pack 120B relays the second remote control command to the tool electronic processor 200 of the shop vacuum 110C. In response to the remote control command, the tool electronic processor 200 of the shop vacuum 110C switches the shop vacuum 110 from the high power draw mode to the low power draw mode and deactivates the motor of the shop vacuum 110C. Accordingly, the shop vacuum 110C may be enabled and disabled essentially simultaneously with the miter saw 110A without any user intervention. In other words, when the miter saw 110A is activated by the user, the shop vacuum 110C is activated, and when the miter saw 110A is deactivated by the user, the shop vacuum 110C is deactivated. This allows the dust collection process to be automated, which saves time for the user and provided a more efficient dust extraction.

In some embodiments, the first battery pack 120A and the second battery pack 120B communicate directly bypassing the mobile device 130. The mobile device 130 may be used to communicatively connect the first battery pack 120A and the second battery pack 120B. The mobile device 130 may be used to pair (for example, Bluetooth® pairing) the first battery pack 120A with the second battery pack 120B. For example, a connection may be initiated using a graphical user interface (GUI) of a software application executing on the mobile device 130. In this example, the mobile device 130 may detect that the battery packs 120A, 120B in wireless communication range; display an identifier for the battery packs 120A, 120B on the GUI; and allow a user to select on the GUI the first battery pack 120 and the second battery pack 120B for pairing with each another. To pair the first battery pack 120A with the second battery pack 120B, the mobile device 130 may provide identification information, connection identification information, and/or password information for the connection to each of the first battery pack 120A and the second battery pack 120B. The first battery pack 120A and the second battery pack 120B use the identification information, connection information, and/or password information to subsequently establish a communication link or to communicate with each other. Particularly, the first battery pack 120A and the second battery pack 120B communicate directly to implement the method 600 as provided above.

Thus, embodiments described herein provide, among other things, a system and method for remote control of a power tool device.

What is claimed is:

1. A system for remote controlling a power tool device comprising:
   a battery pack configured to be coupled to the power tool device, the battery pack including:
      a plurality of cells configured to provide operating power to the power tool device when the power tool device is coupled to the battery pack,
      a pack transceiver,
      a pack electronic processor coupled to the pack transceiver, the pack electronic processor configured to:
         determine that the connected power tool device is remotely controllable,
         receive, wirelessly via the pack transceiver, a remote control command from a mobile device, and
         provide, via a communication link between the pack electronic processor and a tool electronic processor of the power tool device, the remote control command to the power tool device,
      wherein the remote control command specifies an action to be performed by the power tool device,
   a second power tool device; and
   a second battery pack configured to be coupled to the second power tool device, the second battery pack including:
      a second plurality of cells configured to provide operating power to the second power tool device when the second power tool device is coupled to the second battery pack,
      a second pack transceiver, and
      a second pack electronic processor coupled to the second pack transceiver, the second pack electronic processor configured to:
         determine that the connected second power tool device is remotely controllable,
         receive, wirelessly via the second pack transceiver, a second remote control command from the mobile device,
         provide, via a second communication link between the second pack electronic processor and a second tool electronic processor of the second power tool device, the second remote control command to the second power tool device,
      wherein the second battery pack is configured to provide, via the second communication link, a second command to the second power tool device in response to the battery pack providing, via the communication link, a command to the power tool device.

2. The system of claim 1, wherein the power tool device is configured to perform the action specified by the remote control command.

3. The system of claim 1, wherein the battery pack and the second battery pack are configured to communicate directly with one another via the pack transceiver and the second pack transceiver, respectively.

4. The system of claim 1, wherein the remote control command and the second remote control command are the same command.

5. They system of claim 1, wherein the remote control command and the second remote control command are commands to turn the power tool device and the second power tool device ON, respectively.

6. The system of claim 1, wherein:
   the power tool device further includes a mode switch switchable between a first position for selecting a remote control mode and a second position for selecting a normal mode; and
   the tool electronic processor is configured to place the power tool device in the remote control mode in response to the mode switch being in the first position.

7. A method for remote controlling a power tool device by a mobile device, the method comprising:
   determining, by a pack electronic processor of a battery pack, that a connected power tool device is remotely controllable;
   receiving, wirelessly via a pack transceiver of the battery pack, a remote control command from a mobile device;
   providing, via a communication link between the pack electronic processor and a tool electronic processor of the power tool device, the remote control command to the power tool device;
   determining, by a second pack electronic processor of a second battery pack, that a second power tool device is connected and is remotely controllable,
   receiving, wirelessly via a second pack transceiver, a second remote control command from the mobile device,
   providing, via a second communication link between the second pack electronic processor and a second tool electronic processor of the second power tool device, the second remote control command to the second power tool device; and
   providing, via the second communication link, a second command to the second power tool device in response to the battery pack providing, via the communication link, a command to the power tool device,
   wherein the remote control command specifies an action to be performed by the power tool device.

8. The method of claim 7, further comprising performing, by the power tool device, the action specified by the remote control command.

9. The method of claim 7, wherein the battery pack and the second battery pack communicate directly with one another via the pack transceiver and the second pack transceiver, respectively.

10. The method of claim 7, wherein the remote control command and the second remote control command are the same command.

11. The method of claim 7, wherein the power tool device includes a mode switch switchable between a first position for selecting a remote control mode and a second position for selecting a normal mode; and the method further comprises placing, by the tool electronic processor, the power tool device in the remote control mode in response to the mode switch being in the first position.

12. A battery pack connectable to a power tool device and configured to facilitate remote control of the power tool device by a mobile device, the battery pack comprising:

a plurality of cells providing operating power to the power tool device when the power tool device is coupled to the battery pack, a pack transceiver, and a pack electronic processor coupled to the pack transceiver and configured to determine that the connected power tool device is remotely controllable, receive, wirelessly via the pack transceiver, a remote control command from a mobile device, provide, via a communication link between the pack electronic processor and a tool electronic processor of the power tool device, the remote control command to the power tool device, wherein the remote control command specifies an action to be performed by the power tool device, wherein the remote control command is provided to the power tool device in response to a first battery pack providing, via a first communication link, a first command to a first power tool device.

13. The battery pack of claim 12, wherein the remote control command is configured to cause the power tool device to perform the action.

14. The battery pack of claim 12, wherein the battery pack is configured to communicate with a second battery pack via the pack transceiver.

15. The battery pack of claim 12, wherein the remote control command is a command to turn the power tool device ON.

16. The battery pack of claim 15, wherein the power tool device is a vacuum.

* * * * *